(12) United States Patent
Sanoner et al.

(10) Patent No.: US 7,504,817 B2
(45) Date of Patent: Mar. 17, 2009

(54) STUD SENSOR

(75) Inventors: Hughes Sanoner, Discovery Bay (HK);
Desmond Wai Nang Tse, Tsuen Wan (HK); Lawrence Chi Hang Chan, Yuen Long (HK)

(73) Assignee: Solar Wide Industrial Limited, Tsuen Wan, New Territories (HK)

( * ) Notice: Subject to any disclaimer, the term of this patent is extended or adjusted under 35 U.S.C. 154(b) by 160 days.

(21) Appl. No.: 11/692,376

(22) Filed: Mar. 28, 2007

(65) Prior Publication Data

US 2008/0238403 A1     Oct. 2, 2008

(51) Int. Cl.
*G01R 19/00* (2006.01)

(52) U.S. Cl. .......................... 324/67; 324/662

(58) Field of Classification Search .............. 324/67, 324/662
See application file for complete search history.

(56) References Cited

U.S. PATENT DOCUMENTS

| | | | |
|---|---|---|---|
| 3,226,496 A | 12/1965 | Seabury, Jr. | |
| 4,464,622 A | 8/1984 | Franklin | |
| 5,296,807 A | 3/1994 | Kousek et al. | |
| 5,352,974 A | 10/1994 | Heger | |
| 5,512,834 A | 4/1996 | McEwan | |
| 5,619,128 A | 4/1997 | Heger | |
| 6,215,293 B1 | 4/2001 | Yim | |
| 6,249,113 B1 | 6/2001 | Krantz et al. | |
| 6,259,241 B1 | 7/2001 | Krantz | |
| 6,456,053 B1 | 9/2002 | Rowley | |
| 6,894,508 B2 | 5/2005 | Sanoner et al. | |
| 6,989,662 B2 | 1/2006 | Heger et al. | |
| 7,116,091 B2 | 10/2006 | Miller | |
| 7,148,703 B2 | 12/2006 | Miller | |
| 2005/0138886 A1 | 6/2005 | Sanoner et al. | |
| 2005/0194959 A1* | 9/2005 | Miller | ......... 324/67 |

* cited by examiner

*Primary Examiner*—Vincent Q Nguyen
(74) *Attorney, Agent, or Firm*—Leydig, Voit & Mayer, Ltd.

(57) ABSTRACT

A sensing device having a sensing surface for placing against a wall for detecting objects behind a wall lining has first and second sensors, each sensor including at least first and second capacitor plates and associated resistors forming RC circuits having time constants dependent on the adjacent wall material. Detection circuits connected to the RC circuits provide first and second voltage signals having amplitudes dependent on capacitance changes. A processor effects a comparison of the first and second voltage signals, and compares them to establish the magnitude of the voltage difference between the voltage signals, indicating a detected object center position when the difference signal is less than a predetermined value.

19 Claims, 8 Drawing Sheets

STUD SENSOR

BACKGROUND OF THE INVENTION

The invention relates to apparatus for locating objects behind wall linings, and in particular wall framing structures such as studs. Such apparatus are commonly known as stud detectors or stud sensors.

Although the expression "stud" is used, such being a structural member used in building construction typically for supporting internal walls, the expression "stud sensor device" is to be interpreted broadly as indicating a device for locating a variety of objects of similar form including joists and the like.

A variety of such stud sensors are known, generally being configured to detect changes in dielectric constant. The sensor incorporates a capacitor plate mounted in the sensor and a circuit for measuring change in capacitance. The sensor is moved over the wall surface, the variation in dielectric constant being indicated as a change in capacitive effect which is detected. One such sensor is described in U.S. Pat. No. 4,464,622 (Franklin).

To the user it is desirable to be able to accurately detect the stud position, notably its edges and preferably its centre. It is also desirable to be able to detect the depth of the stud beneath the wall covering or lining, this depth also influencing the accuracy of detection of stud position. Typically, in the US wall coverings have thickness graduated in inches from ½, ⅝, ¾, 1¼, 1½, 2 inches.

U.S. Pat. No. 5,352,974 discloses a stud sensor of dual sensitivity, the user being able to manually select sensitivity based on the sensor response.

Applicant's U.S. Pat. No. 6,894,508, the contents of which are hereby incorporated by reference, discloses a stud sensor for detecting the edges of objects behind a wall lining including an input device for allowing a user to select from multiple sensitivities.

Applicant's US 2005/0138886 discloses a stud sensor which includes multiple sensitivity, whereby a user can manually select a required sensitivity according to wall lining thickness. On start up of the unit a reference sensitivity is set associated with the usual minimum wall thickness of ½ inch. The user is then able to manually increase the sensitivity in predefined steps.

In a first aspect the present invention is directed to providing a sensor able to accurately detect the centre of an object behind a wall lining.

According to a first aspect of the invention there is provided a sensing device having a sensing surface for placing against a wall for detecting objects behind a wall lining comprising a first sensor comprising at least first and second capacitor plates and associated resistors forming first and second RC circuits of time constants dependent on the adjacent wall material, a first detection circuit connected to the first and second RC circuits and providing a first voltage signal of amplitude dependent on a change in the time constants of first and second RC circuits, a second sensor comprising at least third and fourth capacitor plates and associated resistors forming third and fourth RC circuits, a second detection circuit connected to the third and fourth RC circuits and providing a second voltage signal of amplitude dependent on a change in time constants, a comparison means configured to receive said first and second voltage signals, and compare them to establish the magnitude of the voltage difference between said voltage signals, and to indicate a detected object centre position when said difference signal is less than or equal a predetermined value.

The first detection circuit preferably includes respective monostable devices triggered by said first and second RC circuits, outputting digital signals of period dependent on the time constant of the RC circuits.

The second detection circuit preferably includes a logic gate receiving said digital signals and outputting said first voltage signal of amplitude dependent on the change of the time constants.

The first and second sensors each comprise a primary capacitor plate, and a secondary capacitor plate of smaller area than said primary plates. This sensor structure is able to provide a particularly sharp response.

The comparison means is preferably incorporated into a processor in which is stored the predetermined value, which may be about 0.04V.

The processor may be configured to detect said voltage signals and to effect a voltage difference calculation when either of the voltage signals exceeds a threshold associated with a background level. Moreover it may be configured to provide a calibration dc bias voltage to said RC circuits in order to maintain a voltage signal of a predetermined magnitude, which calibration may be effected simultaneously for both the circuits.

In a further aspect the invention provides a method of detecting objects beneath wall linings using a sensing device having a first sensor comprising at least first and second capacitor plates and associated resistors forming first and second RC circuits, and a first detection circuit providing a first voltage signal of amplitude dependent on a change in time constants of said RC circuits, a second sensor comprising at least third and fourth capacitor plates and associated resistors forming third and fourth RC circuits, and a second detection circuit providing a second voltage signal of amplitude dependent on a change in time constants of said RC circuits, the method involving the steps of repeatedly detecting said first and second voltages as the sensor is moved over the wall surface, calculating a difference signal, and indicating an object centre position when said difference signal is below a predetermined value.

BRIEF DESCRIPTION OF THE DRAWINGS

Embodiments of the invention are described, by way of example only, with reference to the following drawings in is which.

DETAILED DESCRIPTION OF THE PREFERRED EMBODIMENT

Figure 1:
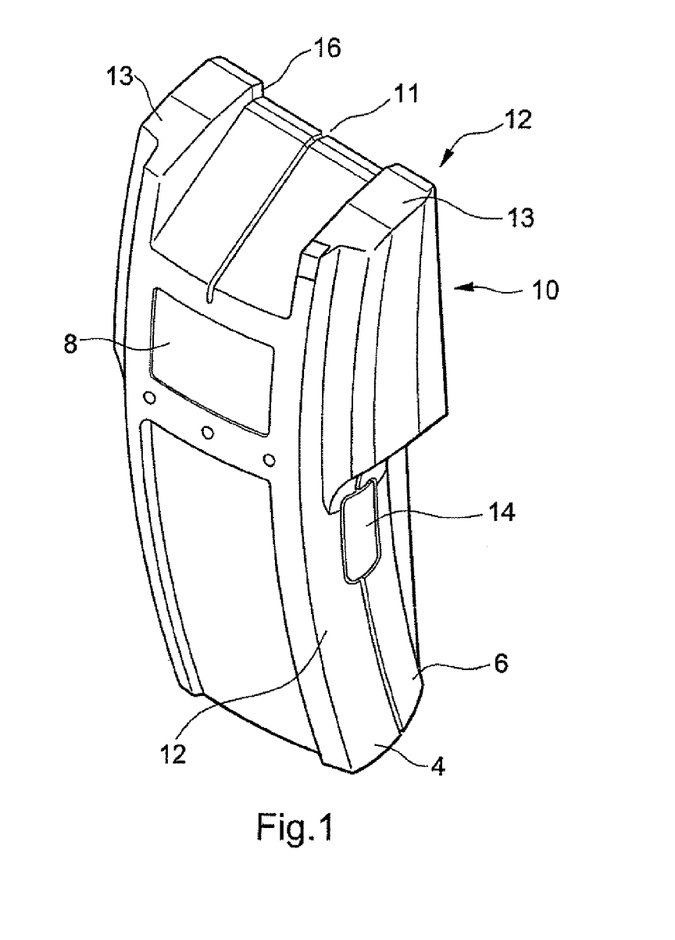
FIG. 1 is an external front perspective view of a stud sensor device according to an embodiment of the invention.

In FIG. 1 there is depicted a stud sensor device for detecting objects behind a wall lining. The device includes a housing 2 formed from front and rear housing elements 4, 6 that clip or secure together at an equator to enclose operating circuitry. The front element 4 includes a display area 8 and the back element 6 includes a detection face 10 that is placed against a wall lining. The housing 2 also includes a grip portion 12. Proximate the grip portion 12 is an on-off push button switch 14. The housing 2 may also have a centre-line groove 11 and a pair of upstands 13 inner edges 16 of which constitute markers, spaced apart by a typical stud width of 1½ inches, in order to indicate stud edges once the centre is found.

Figure 3A:
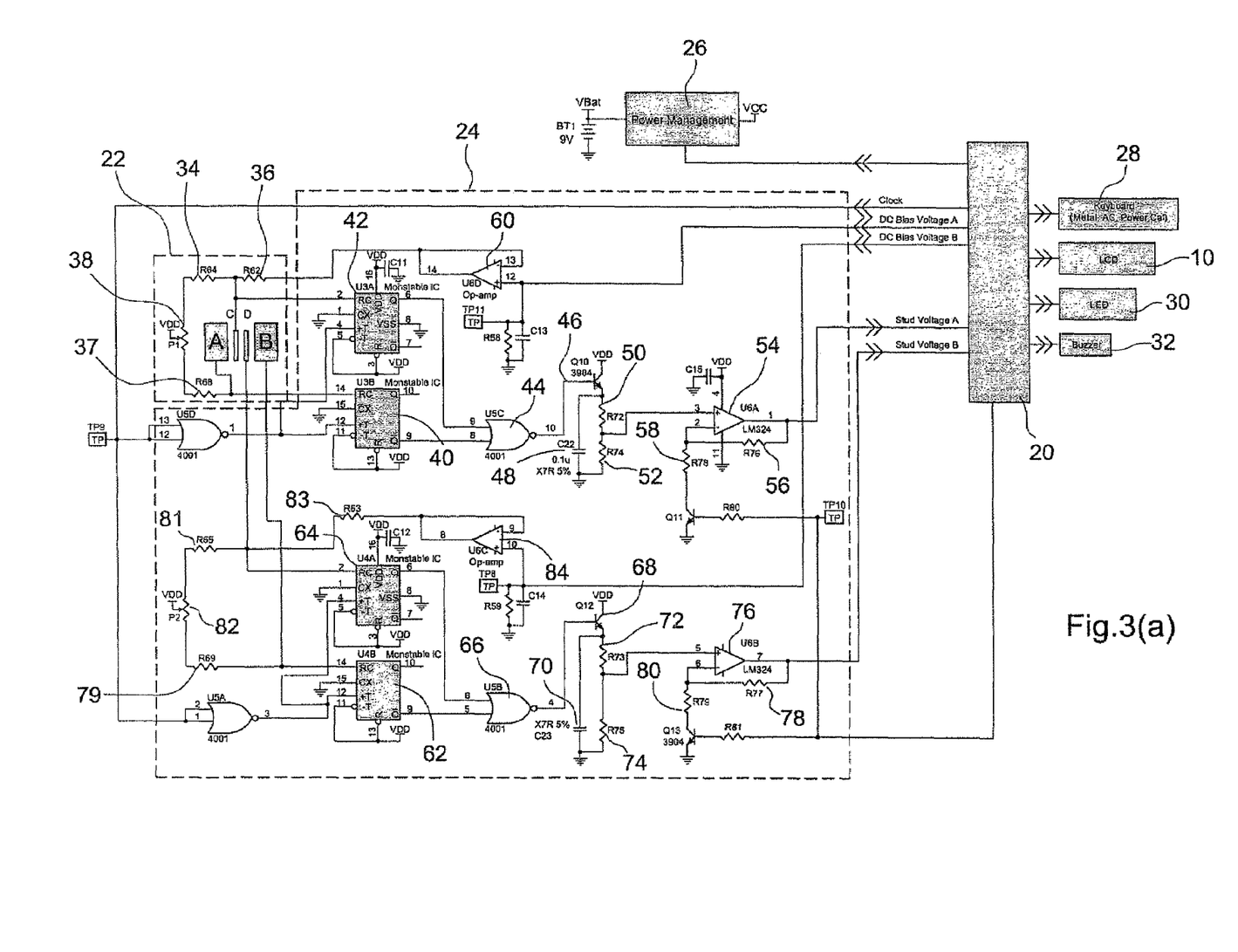
FIG. 3(a) is a circuit diagram of the control electronics for the sensor.

FIG. 3(a) illustrates the operative electronic circuitry of the stud sensor. Central to the control and operation is microcontroller 20. A sensor circuit indicated 22 includes an array of capacitor pads as discussed further below. The major part of the circuit comprises detection and processing circuits 24.

A power management circuit is indicated 26. Outputs from the MCU 20 to go to displays and other user interfaces such as keypad 28, LCD display 10, LED display 30, buzzer 32.

Figure 2:
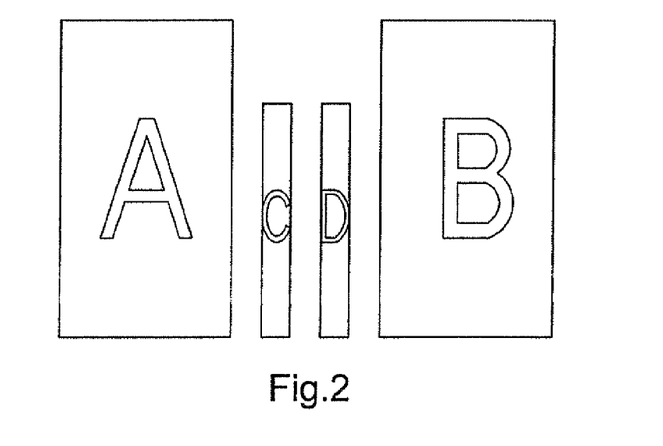
FIG. 2 illustrates the sensor pad structure of the sensor.

The core of the circuit is based on the circuits of Applicant's U.S. Pat. Nos. 6,894,508 and 2005/0138886 the contents of which are incorporated herein by reference. However, instead of using a single primary sensing capacitor plate and a pair of smaller coplanar side plates the sensor circuit 22 preferably uses a pair of sensors each having a coplanar primary plate indicated A, B each with a single respective side coplanar plate C, D arranged between the primary plates A, B as shown in FIG. 2. Each sensor capacitor pair A, C and B, D have their own identical measuring circuits used to derive voltages $V_A, V_B$ indicative of capacitance and hence dielectric constant of adjacent wall material as discussed below.

More particularly, the first primary capacitor plate A defines a first primary capacitor whose capacitance varies with the dielectric constant of the adjacent region of wall, and the secondary capacitor plate C defines a capacitor whose capacitance likewise varies with dielectric constant of the adjacent region of wall. The plates A, C and associated resistors constitute two RC circuits connected respectively to the inputs of the first and second monostable vibrator integrated circuits 40, 42. More particularly, resistors 37 and 38 (part thereof) and plate A constitute the first RC circuit. The second is constituted by resistors 38 (part thereof) and 34 and in parallel resistor 36 and plate C. Variable resistor 38 is used to provide a balancing of RC circuits during factory calibration. The monostable vibrators 40, 42 receive the signals $Rc_a$ and $RC_c$. The respective outputs of the monostable vibrators change for a length of time determined by the time constant of the RC network at the respective input, thereby effectively converting the two RC signals into digital pulses of varying periods according to the times taken for the waveforms to reach the threshold trigger voltages of the monostable vibrators 40, 42.

Figure 4A:
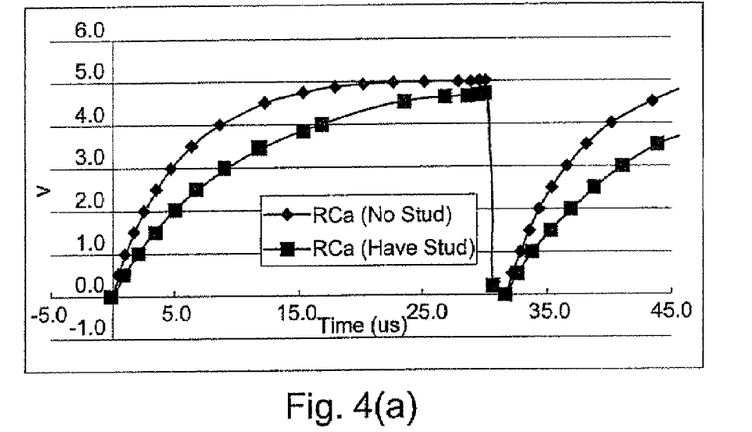
FIG. 4(a) illustrates the detected $RC_a$ waveforms for a primary sensor plate A when a stud is present and absent.
Figure 4B:
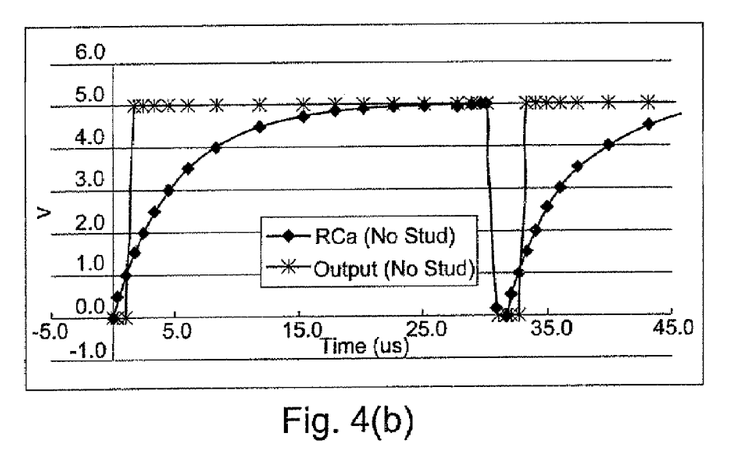
FIG. 4(b) illustrates the detected $RC_a$ waveforms for primary sensor plate A and the output from a monostable vibrator, with no stud.
Figure 4C:
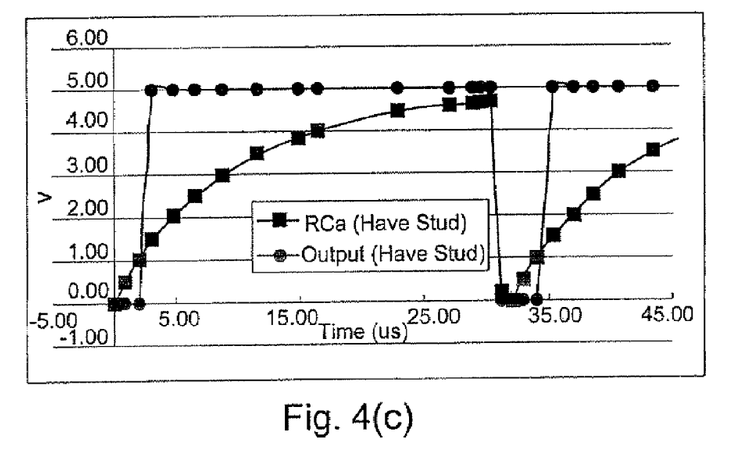
FIG. 4(c) illustrates the detected $Rc_a$ waveform for primary sensor plate A and the monostable vibrator output when a stud is present.

FIG. 4(a) shows the RC voltage response for primary plate A for a situation with no nearby stud, and secondly for a situation with nearby stud. FIG. 4(b) shows also the monostable 40 output for the no stud situation, whilst FIG. 4(c) shows the same with a nearby stud, illustrating the increased time period of each $RC_a$ cycle, and increase in the time of the low state of the digital square wave with detected stud. It will be appreciated that with a stud present both $Rc_a$ and $RC_c$, outputs will have their time periods extended, but that of the main plate (A) $Rc_a$ will be significantly greater than for the side plate (C).

Figure 4D:
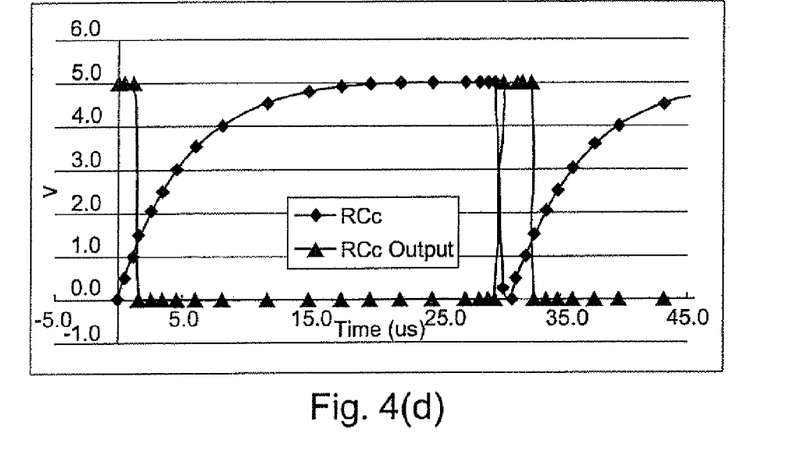
FIG. 4(d) illustrates detected $RC_c$ waveforms for secondary plate C and monostable output with no stud.

FIG. 4(d) shows the RC voltage response $RC_c$ for secondary plate C fed to monostable 42, and the inverted monostable 42 $RC_c$ output. The digital output pulses of the first monostable vibrator 40 and the inverted output pulses of the second monostable vibrators 42 are fed to the inputs of the NOR gate 44.

Figure 5A:
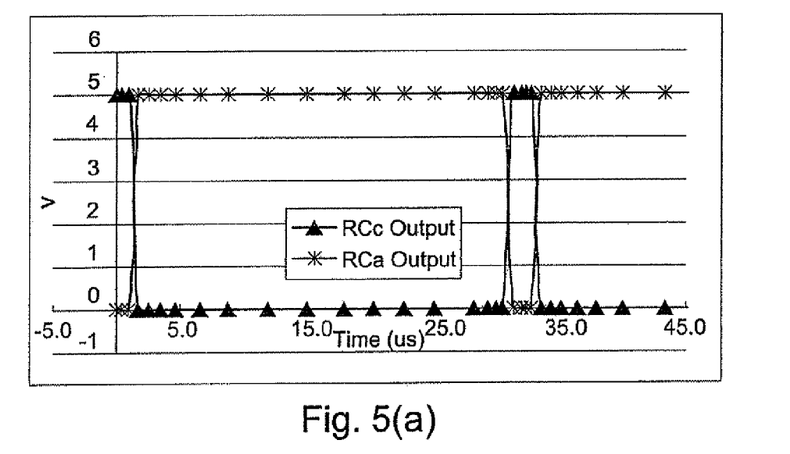
FIG. 5(a) shows the $Rc_a$ and $RC_c$, monostable outputs, for a no stud condition.
Figure 5B:
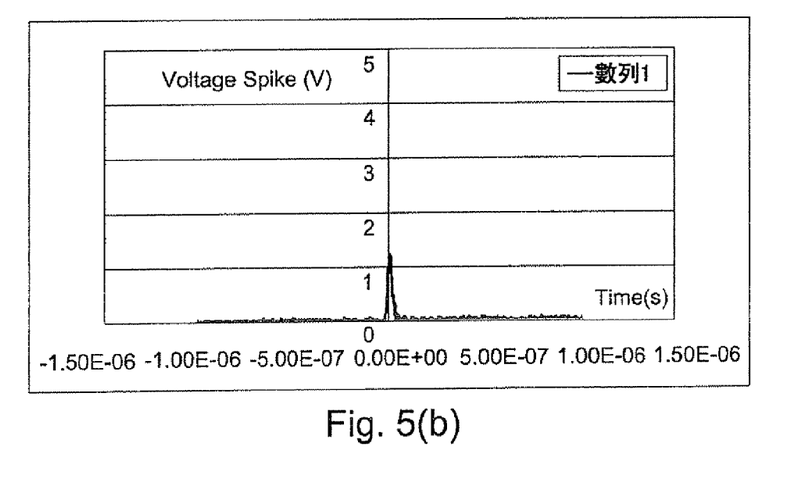
FIG. 5(b) shows the output spike from NOR gate, for no stud.

FIG. 5(b) shows these outputs $Rc_a$, $RC_c$.

Figure 5C:
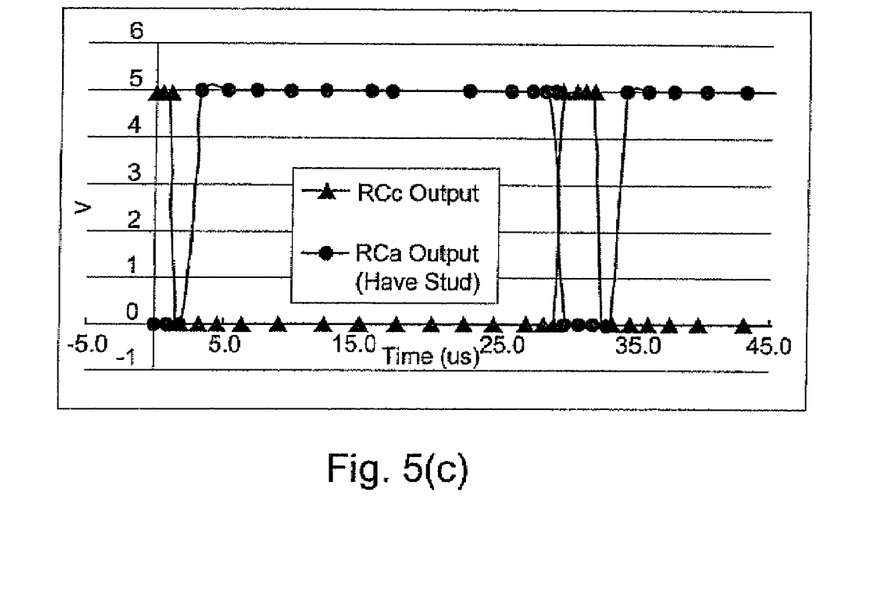
FIG. 5(c) shows the $Rc_a$ and $RC_c$ monostable outputs when a stud is present.
Figure 5D:
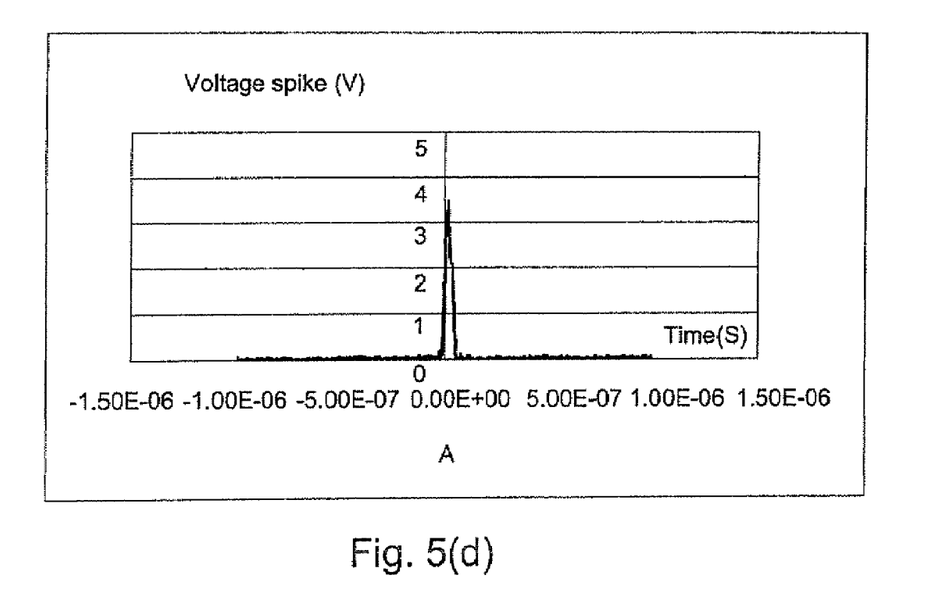
FIG. 5(d) illustrates the output spike from the FIG. 5(c) monostable outputs, ie with stud present.
Figure 6:
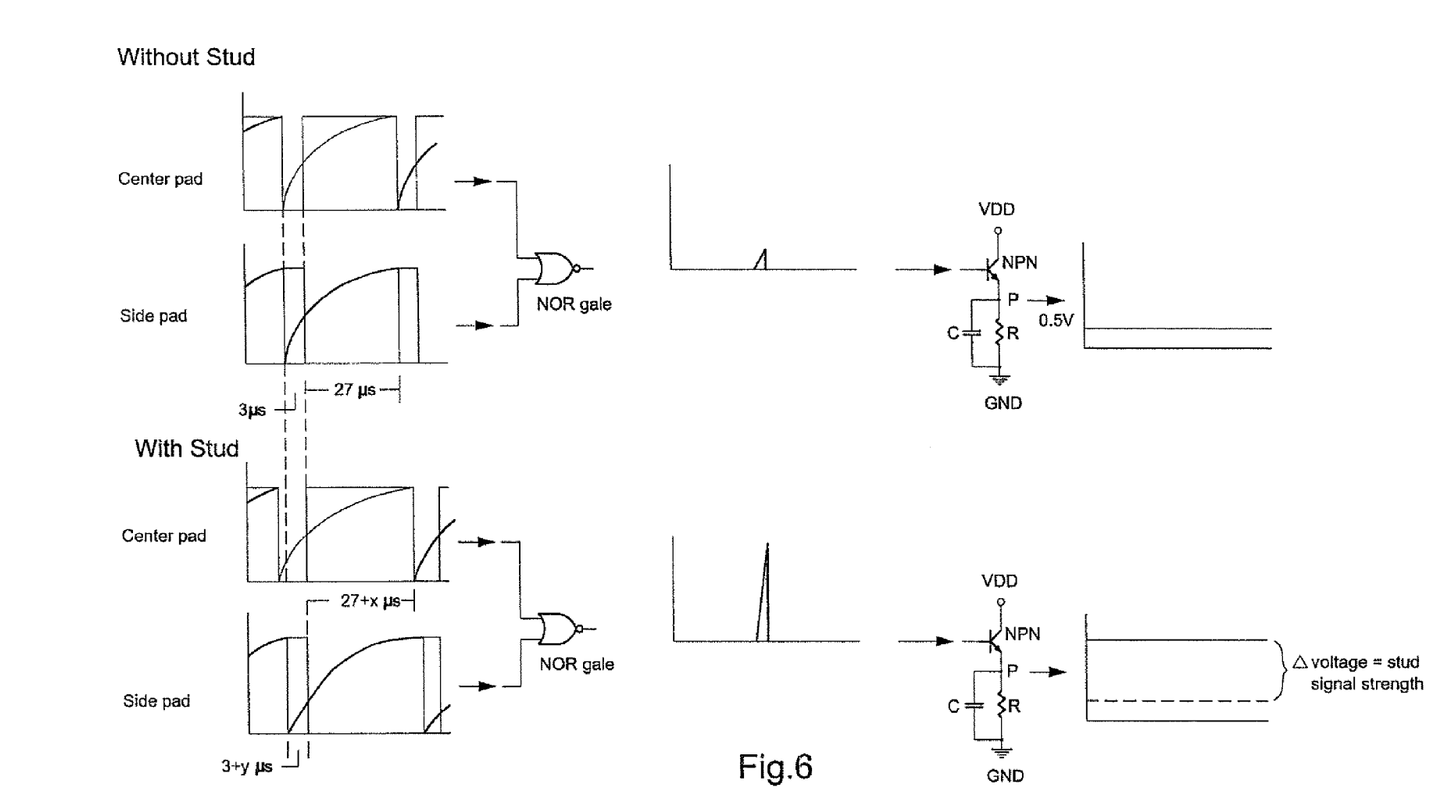
FIG. 6 illustrates schematically the derivation of output analogue signal from the pads in conditions without and with a stud.

The output of the NOR gate 44 is a voltage spike for the duration that the vibrator outputs are both below the logic switching level of the NOR gate 44, ie a voltage spike based on the timing of the overlapping regions of the two square waveforms. FIG. 5(b) shows the voltage spike in a no stud situation. FIG. 5(c) shows the square waveforms superimposed in a situation with a nearby stud, and FIG. 5(d) illustrates the resulting voltage spike. The spike amplitude is therefore dependent on the relative shift in RC time constants of the two RC circuits, ie indicative of detected differences in dielectric constants of adjacent wall material. This is also illustrated in FIG. 6. The NOR gate 44 output is fed to a rectifying circuit comprising NPN transistor 46, capacitor 48 and resistor pair 50, 52. This analogue voltage signal forms the input to operational amplifier 54 the gain of which is set by appropriate selection of resistors 56, 58. The output of operational amplifier 54 is a voltage level $V_A$ which is supplied to the MCU 20. The analogue signal derivation is also schematically illustrated in FIG. 6.

Figure 3B:
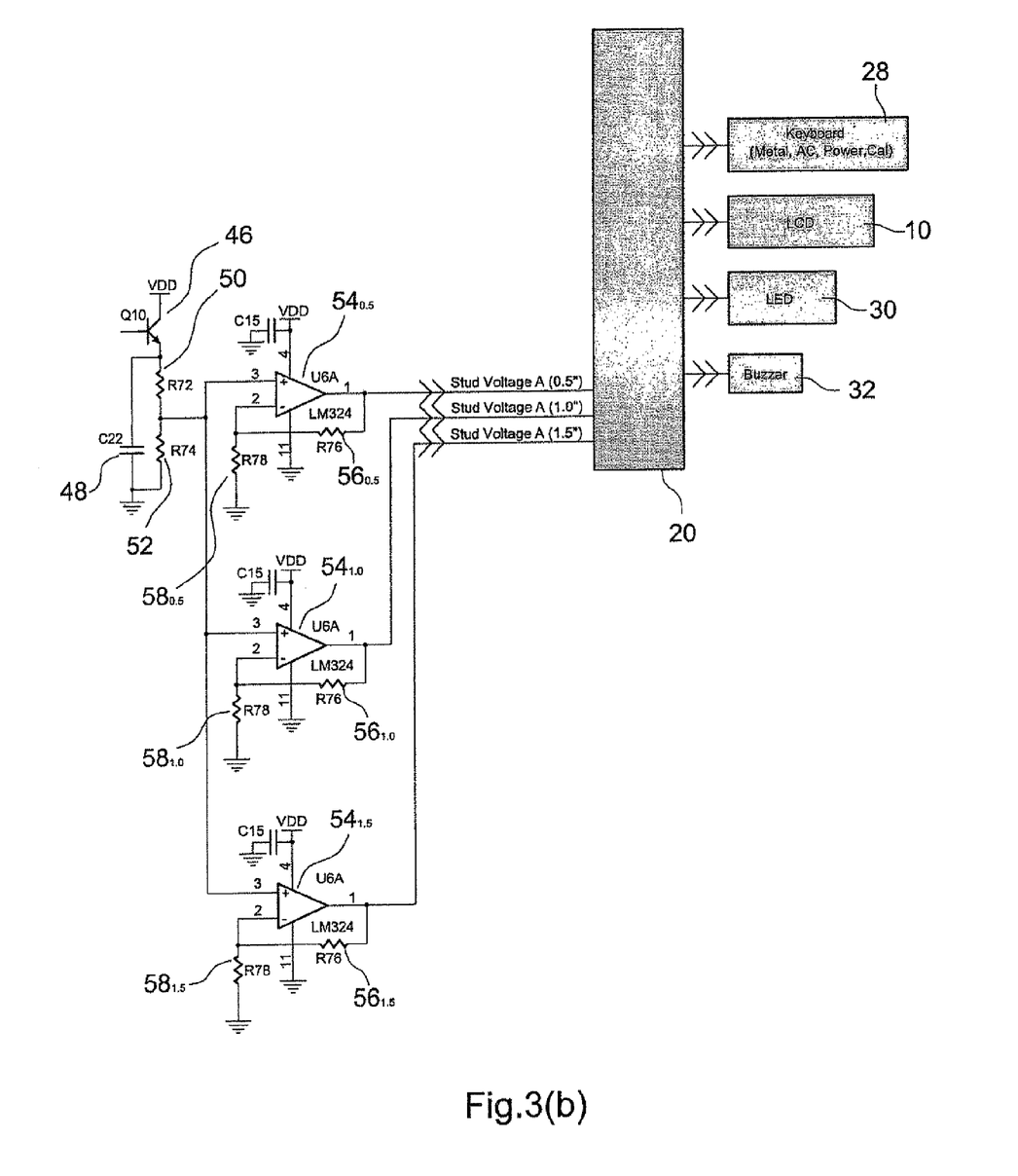
FIG. 3(b) is a circuit diagram showing an alternative amplifier arrangement providing automatic sensitivity adjust according to wall thickness.

In an alternative construction the gain of the operational amplifier 54 may be adjusted according to the wall lining conditions, most significantly its thickness. For example, it may be arranged that the user can adjust the sensitivity through user-selection of a sensitivity level, which adjusts the values of resistors 56, 58. In a further alternative illustrated in FIG. 3(b) a series of operational amplifiers are provided, indicated $54_{0.5}$, $54_{1.0}$ and $54_{1.5}$ each having associated resistors of different values controlling their gains and each providing stud voltages to the MCU 20. The amplifiers are associated with wall lining thickness of 0.5 inch, 1 inch and 1.5 inch respectively, the appropriate thickness being identifiable by the automatic depth calibration technique discussed below, so that the appropriate voltage can be selected by the MCU 20.

Factory calibration of the above-mentioned circuit is achieved firstly by a factory setting of variable resistor 38 within sensor circuit 22, which is able to allow for manufacturing tolerances in sensor resistors and capacitor plates A, C. The variable resistor is adjusted to match the pulses at the monostable vibrator outputs in a no-stud condition, between extreme testing conditions eg high and low humidity.

In addition, on start-up of the device in order to compensate for environmental factors such as particular characteristics of the wall lining material, temperature, humidity, interaction with the user's hand etc a self-calibration process is effected under the control of the MCU 20. MCU 20 provides a DC bias voltage via operational amplifier 60 to provide a voltage range from 0 to 5.0V with 12 bit resolution in order to maintain a predetermined voltage $V_A$ detected at the MCU 20, typically about 0.5V, the MCU 20 increasing or decreasing the amplifier bias voltage in 0.5V steps until appropriate detected voltage $V_A$ is obtained which is discernibly distant from the voltage value which may be induced by background noise (typically about 0.3V). In an alternative the voltage range may be from 0 to 3.5V. In this manner it is possible to bring the effective signal out of the background noise.

In identical manner the primary capacitance sensor pad B and secondary capacitance pad D provide RC signals $RC_b$ and $RC_d$, fed respectively to third and fourth monostable vibrators 62, 64. The primary RC circuit includes capacitor plate B and resistor 79 and part of variable resistor 82. The secondary circuit includes side capacitor plate D, and in parallel resistor 81 and part of 82, and resistor 83. The digital outputs of the monostable vibrator 64 and inverted output from monostable vibrator 64 and inverted output from monostable vibrator 62 are fed to NOR gate 66 which likewise outputs a voltage spike of magnitude dependent on variation of dielectric constant with detected stud, which is rectified via transistor 68, capacitor 70, resistance pair 72, 74 and amplified by operational amplifier 76 according to a gain controlled by resistors 78, 80. The rectified analogue output $V_B$ is fed to MCU 20. Factory calibration of the sensor is by adjustment of variable resistor 82. Calibration on switch-on is likewise effected by control of a dc bias voltage from MCU 20 via amplifier 84, in order to maintain $V_B$ of the predetermined magnitude. To shorten the calibration time prior to use the MCU20 may control the self calibration on both sensors at the same time.

Although not described or illustrated the device will preferably be provided with circuits for detecting wires carrying ac current and/or metal objects as described in Applicant's U.S. Pat. No. 6,894,508 incorporated herein.

MCU 20 utilizes the two stud sensing voltages $V_A$ and $V_B$ and effects a computation of stud position in the following manner. After an initial switch-on calibration period the MCU 20 will process the $V_A$ and $V_B$ voltages. If either is greater than a predetermined background voltage level, (and which may be dependent on wall lining thickness, typically say 1.0V for a 1½ inch wall thickness, or 2.5V for a ½ inch wall thickness), this is indicated to a user on the LCD 10 or LED 30 display, with an indication of the direction of increasing voltage, ie whether the device should be moved to the left or right to be moved closer to the stud, and will operate the centre detection routine, establishing a difference signal $V_D = |V_A - V_B|$. This difference signal $V_D$ is continuously calculated as the sensor is moved over the wall in the vicinity of the stud, the device seeking to establish the sensor device position where $V_D$ is a minimum, indicative of the sensor being centrally over the stud. In practice, the difference $V_D$ will rarely go to zero, but a minimum threshold such as about 0.04V is utilized, $V_D \leq 0.04V$ being used to indicate a centre position. When this position is reached a visual indication is supplied to a user by the LCD 10 or LED 30 display, for example by means of a bar chart display, illumination from a light source or an audible indication may be supplied by buzzer 32. Alternatively, if it is known (or established) that the lining depth is greater than 1 inch, a larger threshold may be selected, such as 0.08V.

Figure 7:
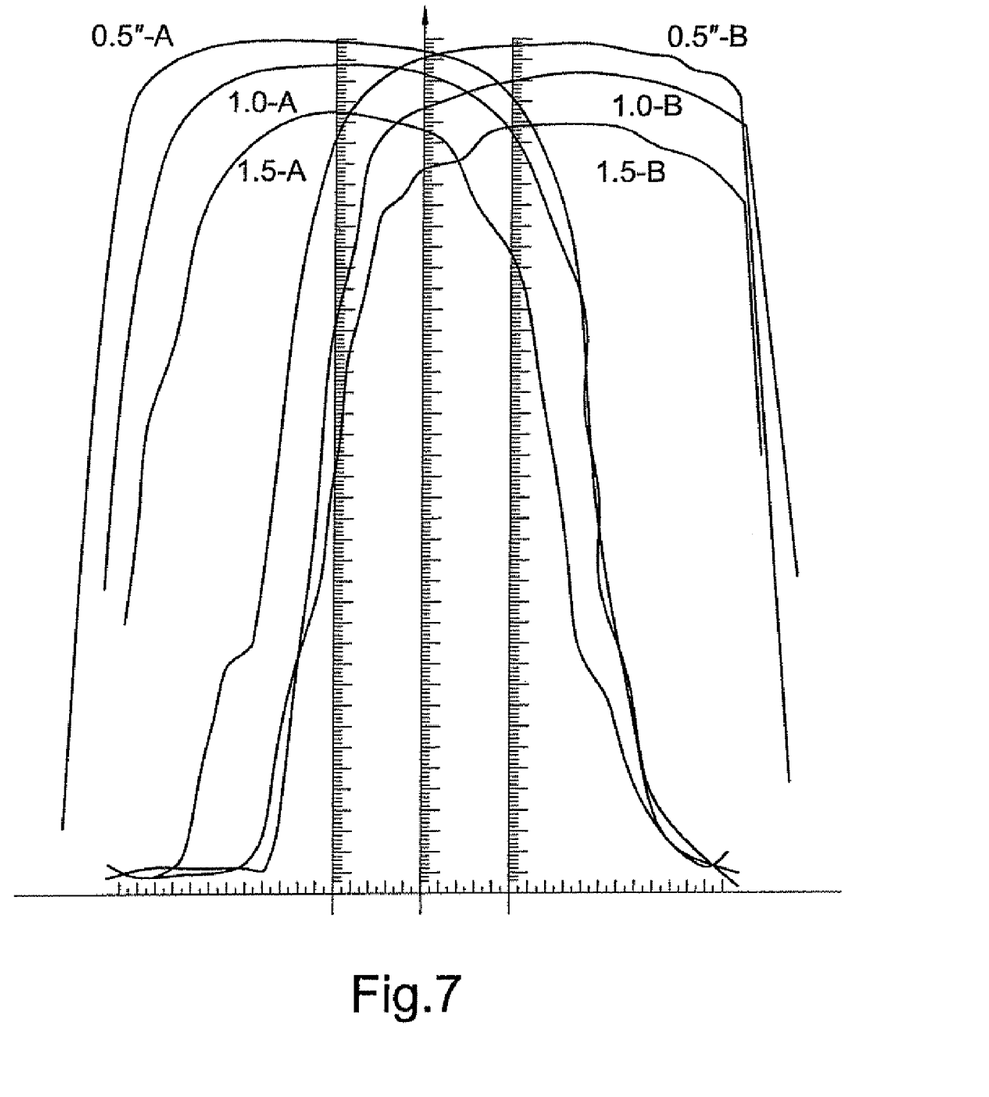
FIG. 7 shows experimental data for variation in detected voltage passing over a stud for various wall lining thicknesses.

The MCU 20 also controls an automatic depth indication and depth calibration. After switch-on calibration is complete, as the sensing device is moved over a stud (with $V_A$ and $V_B$ indicating a voltage greater than background) the MCU 20 processes the signals recording voltage maxima $V_{A\ max}$ and $V_{B\ max}$. As is well known, the voltage curve over a shallow stud has a higher maximum, and a sharper profile, whereas a deeper stud has a lower maximum and less sharp profile with "more blurred" transitions. FIG. 7 shows experimentally obtained curves where 0.5 A"-A represents the variation in $V_A$ over a stud behind a 0.5 inch wall thickness, 1.0"-A the variation in $V_A$ over an 1.0 inch wall thickness lining etc. Within MCU 20 (or an associated memory) there are set a pair of typical maximum threshold voltages indicated $V_{1.0}$ and $V_{1.5}$ associated with studs at depth 1 inch and 1½ inches respectively. Typically $V_{1.0}$ is set at 3.0 volts and $V_{1.5}$ at 2.3 volts. The values of $V_{A\ max}$ and $V_{B\ max}$ are compared to $V_{1.0}$ and $V_{1.5}$. If either $V_{A\ max}$ or $V_{B\ max}$ are greater than $V_{1.0}$ and $V_{1.5}$ then the detected voltage is indicated as representing voltage with a wall thickness of ½ inch. If either $V_A$ or $V_B$ is greater than $V_{1.5}$ but less than $V_{1.0}$ this indicates a wall thickness of 1 inch. If $V_A$ or $V_B$ are lower than $V_{1.0}$ and $V_{1.5}$ the wall thickness is indicated as 1½ inches.

It will be appreciated that in the same manner a greater number of threshold voltages may be stored, with corresponding comparisons of $V_{A\ max}$ or $V_{B\ max}$ with these thresholds, for greater accuracy of depth indication.

Furthermore, the device can be further adopted to distinguish between metal studs and wood studs under a relatively thin dry wall lining say 0.5 inch. If either $V_{A\ max}$ and $V_{B\ max}$ are greater than $V_{0.5}$, $V_{1.0}$ and $V_{1.5}$ then the detected voltage can be indicated as representing a voltage induced from an object of higher dielectric such as metal.

Having identified a wall thickness, this is indicated to a user on the LCD or LED displays, and/or audibly.

Moreover, having established the wall thickness, this thickness value can be utilized to improve the accuracy of edge determination, in selecting a voltage profile which corresponds to that thickness, rather than a generalized profile.

Where in the foregoing description reference has been made to integers or elements having known equivalents then such are included as if individually set forth herein.

Embodiments of the invention have been described, however it is understood that variations, improvements or modifications can take place without departure from the spirit or scope of the invention.

The invention claimed is:

1. A sensing device having a sensing surface for placing against a wall for detecting objects behind a wall lining comprising:

a first sensor comprising at least first and second capacitor plates and first and second resistors forming first and second RC circuits having first and second time constants dependent on adjacent wall material;

a first detection circuit connected to the first and second RC circuits and providing a first voltage signal having an amplitude dependent on a change in the first and second time constants of the first and second RC circuits;

a second sensor comprising at least third and fourth capacitor plates and third and fourth resistors forming third and fourth RC circuits having third and fourth time constants;

a second detection circuit connected to the third and fourth RC circuits and providing a second voltage signal having an amplitude dependent on a change in the third and fourth time constants;

comparison means receiving the first and second voltage signals, and comparing the first and second voltage signals to establish magnitude of voltage difference between the first and second voltage signals, and indicating a detected object center position when the voltage difference is less than a predetermined value.

2. The sensing device according to claim 1 wherein the first detection circuit includes respective monostable devices triggered by the first and second RC circuits, outputting digital signals having periods dependent on the first and second time constants of the first and second RC circuits, and a logic gate receiving the digital signals and outputting the first voltage signal having an amplitude dependent on the changes of the first and second time constants.

3. The sensing device according to claim 1 wherein each of the first and second sensors comprises a primary capacitor plate, and a secondary capacitor plate of smaller area than the primary plate.

4. The sensing device according to claim 1 wherein the predetermined value in the comparison means is about 0.04V.

5. The sensing device according to claim 1 wherein the predetermined value in the comparison means is about 0.08V.

6. The sensing device according to claim 1 wherein the comparison means comprises a processor in which is stored the predetermined value.

7. The sensing device according to claim 2 wherein the logic gate is a NOR gate.

8. The sensing device according to claim 1 wherein the processor detects the first and second voltage signals and effects a voltage difference calculation when either of the first and second voltage signals exceeds a threshold associated with a background level.

9. The sensing device according to claim 1 including a display, wherein the processor indicates to a user on the display direction of increasing voltage, representing direction towards a detected object.

10. The sensing device according to claim 1 including a display, wherein the detected object center position is indicated visually on the display of the device.

11. The sensing device according to claim 1 wherein the detected object center position is indicated audibly to a user.

12. The sensing device according to claim 7 wherein the detection circuit includes a voltage rectifier connected to the NOR gate, whereby a voltage spike from the NOR gate is rectified to become an analogue voltage signal.

13. The sensing device according to claim 6 wherein the processor simultaneously provides calibration dc bias voltages to the first, second, third, and fourth RC circuits to maintain voltage signals of a predetermined magnitude.

14. The sensing device according to claim 13 wherein the predetermined voltage is about 0.5V.

15. The sensing device according to claim 1 having a housing including a pair of markers spaced 1½ inches apart to indicate to a user typical edge positions once a center location has been found.

16. A method of detecting objects beneath wall linings using a sensing device having a first sensor comprising at least first and second capacitor plates and first and second resistors forming first and second RC circuits, and a first detection circuit providing a first voltage signal having an amplitude dependent on a change of time constants of the first and second RC circuits, and a second sensor comprising at least third and fourth capacitor plates and third and fourth resistors forming third and fourth RC circuits, and a second detection circuit providing a second voltage signal having an amplitude dependent on a change of time constants of the third and fourth RC circuits, the method comprising repeatedly detecting the first and second voltages as the sensor is moved over the wall lining, calculating a difference signal, and indicating an object center position when the difference signal is below a predetermined value.

17. The method according to claim 16 wherein the predetermined value is about 0.04V.

18. The method according to claim 16 wherein the predetermined value is about 0.08V.

19. The method according to claim 16 including comparing the first and second voltages, repeatedly detecting the larger of the first and second voltages as the sensor is moved over the wall lining, and calculating the difference signal once the device is moved to a position where the larger voltage has exceeded a voltage maximum.

* * * * *